United States Patent [19]

Reichl

[11] Patent Number: 4,736,114

[45] Date of Patent: Apr. 5, 1988

[54] ELECTRICAL SWITCHING SYSTEM AND METHOD TO SWITCH THIS SYSTEM

[75] Inventor: Erwin Reichl, Tegernheim, Fed. Rep. of Germany

[73] Assignee: Sachsenwerk Licht- und Kraft-Aktiengesellshaft, Regensberg, Fed. Rep. of Germany

[21] Appl. No.: 832,001

[22] Filed: Feb. 24, 1986

[30] Foreign Application Priority Data

Feb. 23, 1985 [DE] Fed. Rep. of Germany ....... 3506383

[51] Int. Cl.$^4$ .............................................. H01H 9/20
[52] U.S. Cl. .......................................... 307/11; 307/64; 307/112; 200/144 A; 200/144 B; 200/11 TC; 200/153 LB
[58] Field of Search ................. 307/11, 112, 115, 116, 307/126, 132 R, 87, 85, 139, 18, 19, 20, 86, 21, 23, 24, 25, 29, 64; 361/1, 2, 6, 8, 12, 13, 14; 200/6 B, 6 BA, 9, 10, 11 J, 11 TC, 17, 18, 37 A, 38 R, 11 E, 61.74, 61.76, 67 R, 67 A, 68.2, 77, 67 PK, 153 L, 153 LA, 153 LB, 153 SC, 144 A, 144 R, 144 B, 144 AP, 144 C, 267, 266, 268, 269, 147 R, 148 R, 146 R, 148 AF, 253, 252, 242, 238, 338, 339

[56] References Cited

U.S. PATENT DOCUMENTS

| 2,398,007 | 4/1946 | Hunter | 200/17 R X |
|---|---|---|---|
| 3,133,264 | 5/1964 | Fieser et al. | 200/153 LB X |
| 3,383,485 | 5/1968 | Nadzam et al. | 200/67 A X |
| 3,415,957 | 12/1968 | Bleibtreu et al. | 200/11 TC X |
| 3,467,800 | 9/1969 | Barr | 200/11 TC X |
| 3,526,735 | 9/1970 | Date | 200/144 B X |
| 3,532,842 | 10/1970 | Fohrhaltz | 200/144 B |
| 3,590,192 | 6/1971 | Bould | 200/153 LB X |
| 3,597,556 | 8/1971 | Sharp | 200/153 LB X |
| 3,735,075 | 5/1973 | Kidd | 200/278 X |
| 3,936,782 | 2/1976 | Moakler et al. | 307/64 |
| 4,021,678 | 5/1977 | Moakler et al. | 307/64 |
| 4,371,820 | 2/1983 | Kruger | 200/153 LA X |
| 4,445,017 | 4/1984 | Stewart et al. | 200/144 A |

FOREIGN PATENT DOCUMENTS

| 0005209 | 11/1979 | European Pat. Off. . | |
| 0103413 | 3/1984 | European Pat. Off. | 200/153 SC |
| 126882 | 12/1984 | European Pat. Off. . | |
| 0177951 | 4/1986 | European Pat. Off. | 200/144 R |
| 569455 | 2/1933 | Fed. Rep. of Germany . | |
| A18326 | 2/1956 | Fed. Rep. of Germany . | |
| K11405 | 8/1956 | Fed. Rep. of Germany . | |
| 1690739 | 6/1970 | Fed. Rep. of Germany . | |
| 2108013 | 9/1972 | Fed. Rep. of Germany | 200/11 TC |
| 3119523 | 11/1982 | Fed. Rep. of Germany . | |
| 3412637 | 10/1985 | Fed. Rep. of Germany . | |
| 1519907 | 4/1968 | France | 200/153 LB |

OTHER PUBLICATIONS

Helmut Kindler and Erwin Reichl, "Metallgekapselte, SF$_6$-Isolierte Mittelspannungs-Schaltanlage Baureihe WI mit Vakuum-Leistungsschaltern", Techn. Mitt. Aeg-Telefunken, 72, (1982), pp. 72-79.

Primary Examiner—William M. Shoop, Jr.
Assistant Examiner—Paul Ip
Attorney, Agent, or Firm—Spencer & Frank

[57] ABSTRACT

An electrical switching system, and a method for switching this system, which is composed of two bus bars, a coupling switch which is connected between the bus bars and performs the circuit breaking and switching actions, and respective multiposition disconnect switches connected to the input and output lines or terminals. The multiposition disconnect switches are used to switch the terminals between bus bars without interruption of the current flowing through the respective terminals.

17 Claims, 8 Drawing Sheets

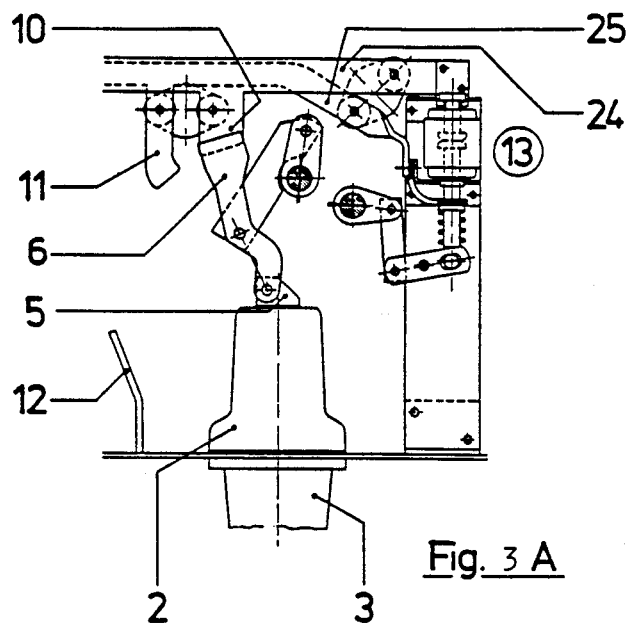
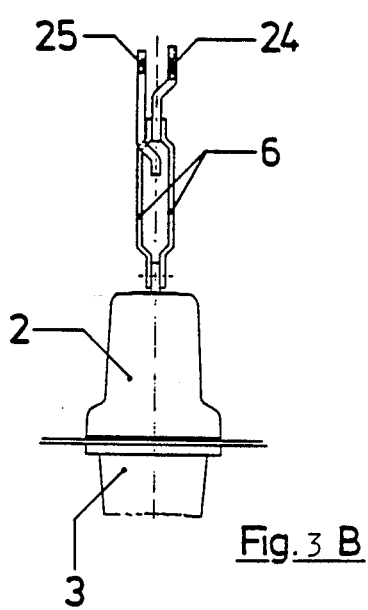
Fig. 3 A
Fig. 3 B
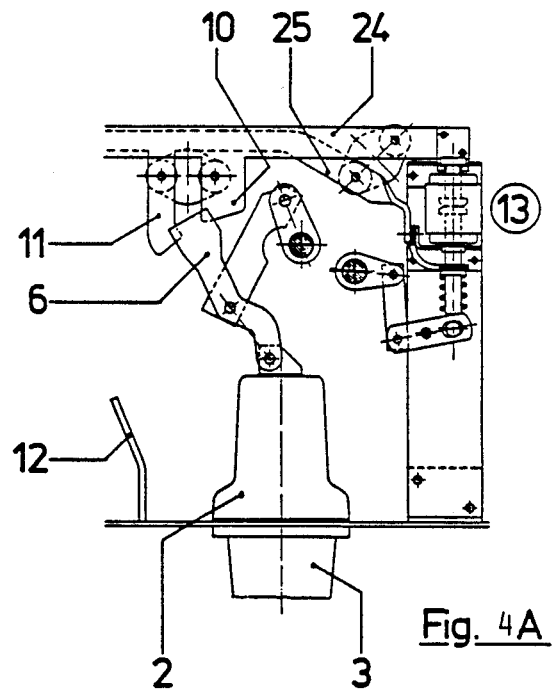
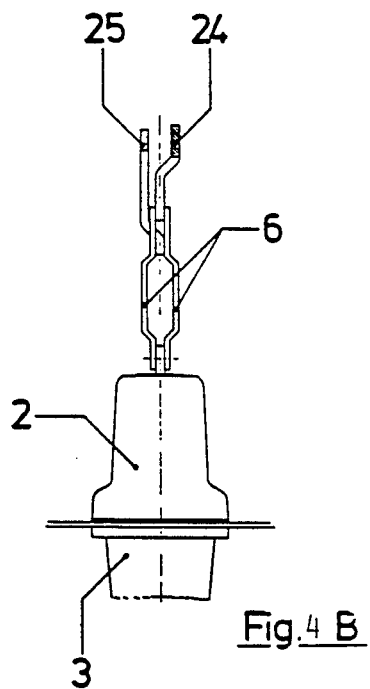
Fig. 4A
Fig. 4 B

ELECTRICAL SWITCHING SYSTEM AND METHOD TO SWITCH THIS SYSTEM

BACKGROUND OF THE INVENTION

The present invention relates to a novel electrical switching system. More particularly, the present invention relates to an electrical switching system, particularly for medium voltages, of the type having two bus bars which can be electrically connected by a coupling switch, with the coupling switch performing the connections of loads and power for a plurality of input and output terminals, each of which is connectable with both bus bars via respective disconnect switches.

Switching systems form the nodes of electrical networks for the transmission and distribution of electrical energy. In these nodes, one or a plurality of lines feeding in energy and one or a plurality of load terminals can be connected together. The switching devices here serve the purpose of establishing the electrical connections and of switching operational and/or short-circuit currents. In the past, it has been the custom to include a load or power disconnect switch in each line that is to be connected or disconnected.

The development in switching systems and switching devices is characterized, inter alia, by noticeable cost pressure. Proposals have therefore been made to perform the switching tasks in a system comprised of a plurality of output terminals and/or input terminals with a reduced number of switching devices.

In Federal Republic of Germany Patent application Ser. No. K-11405, published Aug. 9th, 1956, it is proposed to employ a double bus bar system having a coupling switch connected between the bus bars as the central circuit breaker for all input and output terminals of the switching system. Circuit breakers are then no longer necessary in the individual input and output lines and only two disconnect switches leading to the bus bars from each terminal are required. By appropriate control, in time synchronism, of the two disconnect switches of one line and the central coupling switch, loads can be connected and disconnected, with the actuation of the disconnect switch occurring each time in the currentless state. Before and after a switching action, the coupling switch is open. The drawback of such a switching system, and of such a method of actuation, is that five switching actions are required for a disconnection or a connection. Short-circuit disconnects, which must occur very quickly, cannot be effected with this actuation method because of this drawback. For that reason, the cited patent application provides fuses in each output line and in each input line to take over the rapid short-circuit disconnection.

SUMMARY OF THE INVENTION

It is an object of the present invention to provide a switching system employing only one load or power disconnect switch, and a method for actuating the system, which permits faster switching because of a reduction in the total number of switching actions and switching devices required for both connection and disconnection. In such a system a switching action at one terminal should not interrupt the remaining input and output terminals. Such a system and a corresponding method for actuating it should permit rapid and simple load switching and additionally should permit short-circuit disconnects by the circuit breaker, and thus eliminate the need for fuses in the individual outgoing and incoming terminals.

The above object is achieved according to the present invention in that, in an electrical switching system, particularly a medium voltage switching system, for a plurality of input and output terminals including a main bus bar, an auxiliary bus bar, a coupling switch means, electrically connected between the bus bars, for performing the connections of loads and power for the plurality of input and output terminals, and disconnect switch means for selectively coupling each of the terminals with the bus bars; the disconnect switch means includes a respective single multiposition disconnect switch connected to each of the terminals for selectively connecting same to the bus bars, with each multiposition disconnect switch having a normal ON-position wherein it forms a galvanic connection between the respective associated terminal and only the main bus bar, a further ON-position wherein it forms a galvanic connection between the respective associated terminal and the auxiliary bus bar, and means for effecting, during switching, the transition of current from the main bus bar to the auxiliary bus bar without interruption of the current; and the respective terminals are in direct electrical connection with only the main bus bar via the respective multiposition disconnect switches during normal operation and are connected with the auxiliary bus bar only during respective connect and disconnect processes.

Preferably the means for effecting the uninterrupted transition of current is realized in that the switch contacts ar configured in a slip contact arrangement. More specifically, according to a feature of the invention, the slip contact arrangement of each multiposition disconnect switch includes a moveable contact connected to the respective associated terminal, a first stationary contact connected to the main bus bar, and a second fixed contact connected to the auxiliary bus bar, and with the first and second stationary contacts being spaced and disposed in the path of movement of the moveable contact, the moveable contact and the first and second stationary contacts being configured to form galvanic slip contacts, and the moveable contact having a length sufficient to bridge the space between the stationary contacts and simultaneously galvanically contact the first and second stationary contacts.

Due to the fact that the switching device responsible for load switching and/or short-circuit disconnects is disposed as a coupling switch between two bus bars and that the input or voltage feeder lines or terminals as well as the output or load terminals can be connected with one another by uninterrupted switchable multiposition disconnect switches, this solution provides the advantage that the switching of a load or of an error disconnect requires the synchronized actuation of only two switching devices in each case.

Multiposition disconnect switches are known in principle and are used, in particular, for SF$_6$-insulated medium voltage switching systems connected in series with a circuit breaker. Such a system is disclosed, for example in the article by H. Kindler and E. Reichl: Metallgekapselte, SF$_6$-Insulierte Mittelspannungs-Schaltanlagen Baureihe WI mit Vakuum-Leistungsschaltern (Metal Encapsulated, SF$_6$-Insulated Medium Voltage Switching Systems, Series WI with Vacuum Circuit Breakers), *Techn. Mitt. AEG-Telefunken* (Technical Reports from AEG-Telefunken), Vol. 72 (1982), pages 72–79. A multiposition disconnect switch usually combines the function of a disconnect switch and a grounding arrangement within one device. Such multiposition disconnect switches, however, do not serve the purpose, and are not capable, of switching while current is flowing. Therefore, an interlocking switch system takes care that the multiposition disconnect switch can be switched only if the circuit breaker is open.

The multiposition disconnect switch according to the invention differs from prior art embodiments by the fact that, due to the appropriate configuration of the contacts, uninterrupted and spark-free switching of current from one bus bar to the other is possible. Beyond the function of the prior art multiposition disconnect switch, the switch according to the invention is thus able to connect one terminal with two or more bus bars and it is able to switch from one bus bar to another bus bar without interruptions.

According to the present invention, the method described below is proposed for the actuation of the load or power disconnect i.e., interrupt switch, which is provided as the coupling switch, and to actuate the multiposition disconnect switch belonging to the particular circuit being switched. Throughout this application the one of the two bus bars which is normally without current is hereinafter called the auxiliary bus bar, and the other bus bar through which the entire current of the switching system normally flows is hereinafter called the main bus bar. The coupling switch between the main bus bar and the auxiliary bus bar is normally closed.

A terminal connected with the main bus bar via a multiposition disconnect switch and carrying a load that is to be switched off or disconnected will now be described. For a disconnection, the terminal of interest is initially commutated without interruption, and with the aid of the multiposition disconnect switch, from the main bus bar to the auxiliary bus bar so that the current flowing through this terminal can now flow through the auxiliary bus bar and the closed coupling switch to the main bus bar. After completion of the commutation and after reaching the spacing between the main bus bar contact and the mobile contact of the multiposition disconnect switch required to maintain the necessary insulation, the coupling switch opens and thus interrupts the current. Once the coupling switch is open, the multiposition disconnect switch is moved into the disconnect position and thus the terminal is disconnected from the auxiliary bus bar. Thereafter the coupling switch is closed again and the switching process is complete.

Depending on the engineering design, the movement of the multiposition disconnect switch may be continuous or in steps Synchronization in time between the position of the multiposition disconnect switch and the position of the coupling switch are required in any case.

A connection process according to the present invention for a terminal occurs as follows. Before the connection is made, the coupling switch is in the closed position and the multiposition disconnect switch is in the disconnect position. For a connection, the coupling switch is initially opened and then the terminal is connected via the multiposition disconnect switch with the auxiliary bus bar. Thereafter the coupling switch is closed and the connection has been made. Now the current flow is commutated without interruption from the auxiliary bus bar to the main bus bar via further movement of the multiposition disconnect switch.

The present invention can be put to particularly advantageous use in $SF_6$-insulated switching systems since here the contact spacing of the interruption-free switchable multiposition disconnect switch can be kept relatively small due to the high insulating capability of $SF_6$.

The methods for connecting and disconnecting a line are advisably implemented by appropriate electrical and/or mechanical coupling of the drives for the coupling switch and the respective multiposition disconnect switch. For switching, it is then only necessary to issue one switching order which acts on both of the participating switching devices.

BRIEF DESCRIPTION OF THE DRAWINGS

FIG. 3a is a partial view of the ring main unit of FIG. 2 showing a multiposition disconnect switch in the ON-position and the coupling switch in the associated position.

FIG. 3b is a partial sectional view of a phase of the disconnect switch according to FIG. 3a.

FIGS. 4a and 4b are views similar to FIGS. 3a and 3b respectively but with the disconnect switch in the commutation position.

DETAILED DESCRIPTION OF THE PREFERRED EMBODIMENT

Figure 1:
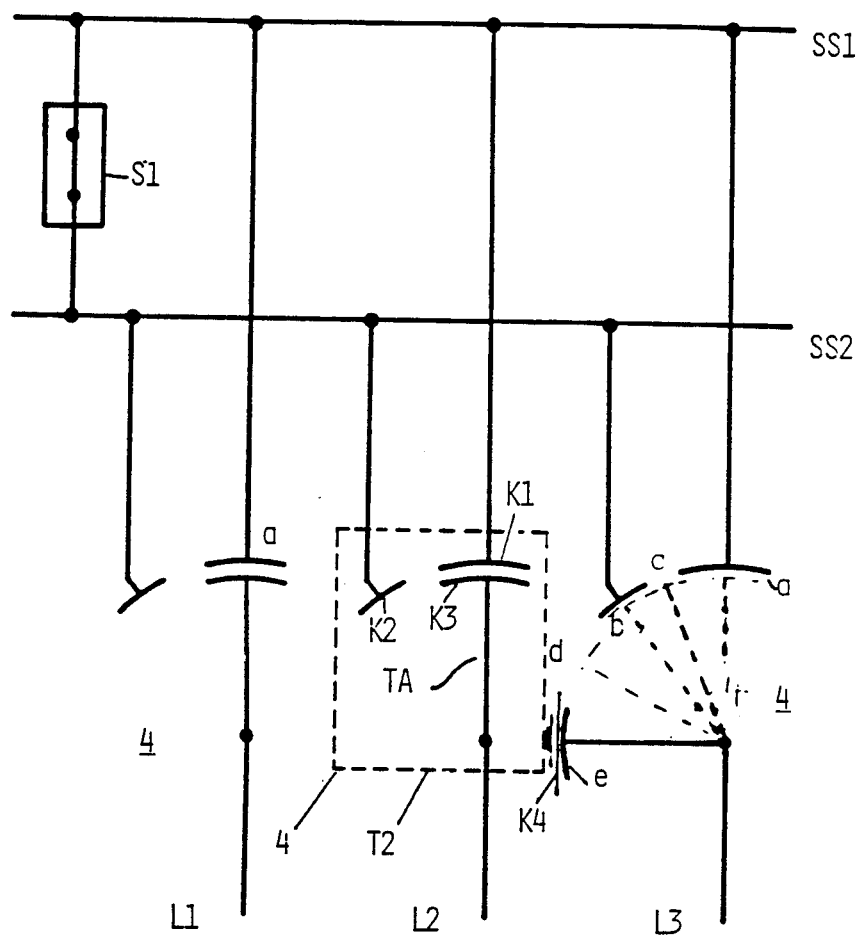
FIG. 1 is a schematic diagram of a switching system according to the invention.

Referring now to FIG. 1, there is shown a schematic illustration of a switching system according to the invention for three input/output line L1, L2 and L3, with L1 being, for example, an input of voltage feeder line, and L2 and L3 being output or load lines. Connected to each of the lines L1, L2 and L3 is a respective multiposition disconnect switch 4 which are all essentially of the same configuration. Each switch 4 includes a first stationary contact K1 connected to a main bus bar SS1, a second stationary contact K2 connected to an auxillary bus bar SS2, and a moveable contact K3 which is connected by a moveable disconnect arm TA to the terminal for a respective line L1, L2 or L3. The spacing between contacts K1 and K2 and the width of contact K3 are so related that although the contacts K1 and K2 are sufficiently spaced to provide the desired electrical isolation, the contact K3 can bridge the spacing and simultaneously galvanically contact both contacts K1 and K2. As shown in connection with line L3, the disconnect switch 4 may additionally include a further grounded stationary contact K4.

As indicated in connection with the switch 4 connected to the line L3, the disconnect arm TA with its moveable contact K3 can assume a number of positions. In particular, the disconnect arm TA can assume a closed or ON position (a) in which contacts K3 and K1 are galvanically connected so as to connect the associated line to only the main bus bar SS1; a position (b) wherein the contacts K3 and K2 are galvanically connected so as to connect the associated line to only the auxiliary bus bar SS2; an intermediate position (c) wherein the contact K3 is galvanically connected to both of the contacts K1 and K2 so as to connect the associated line to both bus bars SS1 and SS2; an open or off position (d) wherein the contact K3 is not connected to any other contact; and a position (e) wherein the contact K3 is galvanically connected to the ground contact K4. Thus, in FIG. 1 the switches 4 associated with the input line L1 and the output or load line L2 are shown in the closed or ON position (a), while the switch 4 associated with output line L3 is shown in the grounded position (e).

Disposed or connected between the main bus bar SS1 and the auxiliary bus bar SS2 is a known power or load switching device S1. The power or load switching device S1, (hereinafter called a coupling switch), which is closed in the operating or normal state of the switching system, is of conventional known design. If now a load current or a short-circuit current is to be interrupted or disconnected at, for example, load line L2, the associated multiposition disconnect switch 4 is actuated to cause its disconnect arm TA to move contact K3 from contact K1 toward contact K2. Due to the above mentioned relationship between the distance between contacts K1 and K2 and width of contact K3, the current flow is commutated without interruption and without sparks from main bus bar SS1 via contact K1 to the auxiliary bus bar SS2 as the contact K3 moves from position (a) to position (b) via position (c). Once the galvanic separation of contacts K1 and K3 has taken place and these contacts are spaced at a distance which is sufficient for the now required insulation capability, coupling switch S1 opens and interrupts the current flow to the auxiliary bus bar SS2. By accordingly synchronizing the rotation of disconnect arm TA with the functioning of coupling switch S1, it is assured that contacts K2 and K3 continue to be galvanically connected until the current is interrupted at position (b). After completion of the current interruption, disconnect arm TA2 continues to move until contact K3 reaches the open or disconnect position (d). Coupling switch S1 then closes again and the process is complete.

A turn-on process will likewise be described for the example of load line L2. Initially, with the contact K3 in the open position (d), the coupling switch S1 is opened and the disconnect arm TA is moved out of the disconnect position in the direction of contact K2. After galvanic contact is established between contacts K2 and K3, the coupling switch S1 is again closed. The current thus flows initially from auxiliary bus bar SS2 and contact K2 to contact K3. The disconnect arm TA continues to move in the direction of contact K1. Once contacts K2 and K3 are galvanically separated, the current commutates without interruption and without sparks to contact K1 and disconnect arm TA with contact K3 moves into its end or ON position (a). The turn-on process is then completed.

Figure 2:
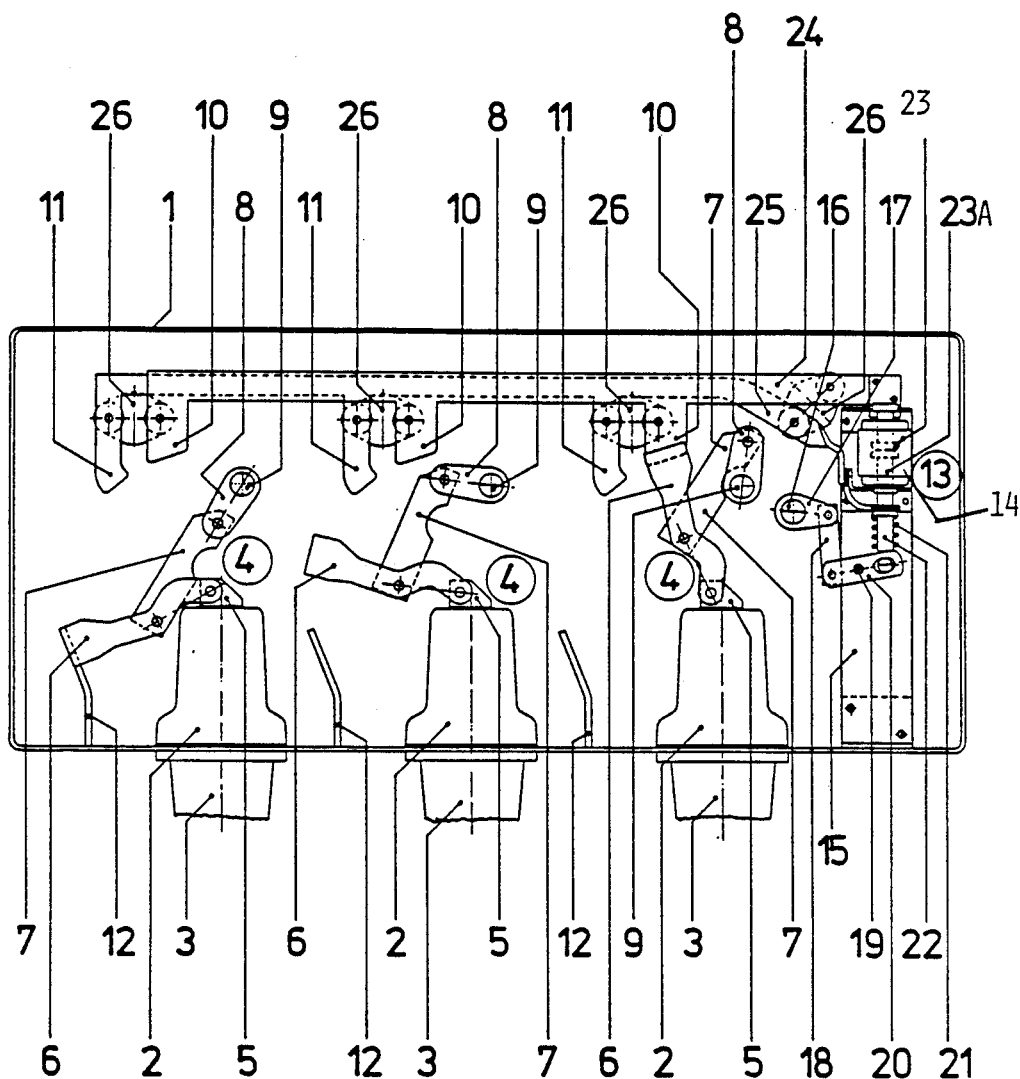
FIG. 2 is a front view of an $SF_6$-insulated ring main unit having three terminals with the front wall removed.

Turning now to FIG. 2, there is shown an actual preferred embodiment of a switching system according to the invention for a SF$_6$-insulated ring main unit having three multiposition disconnect switches 4. It should be noted that the actual switching system is a three phase system so that each of the three multiposition disconnect switches 4 is a three phase switch with only one phase per switch being shown in FIG. 2. Additionally, in FIG. 2, the multiposition disconnect switches 4 are illustrated with one switch 4 in the ON position, one switch 4 in the OFF position and one switch 4 in the grounded position, with these positions being shown from the right to the left.

The entire switching system is accommodated in a metal, gas tight and grounded housing 1. In order to provide an interface between the switching system itself and the incoming and outgoing lines, the housing is provided with three gas-tight feed-throughs or sockets 2 per switch 4 (only one feed-through 2 per switch 4 being shown). The input and output cables or lines are connected to the switching system via the feed-throughs 2 by means of respective plug-in connections 3.

As indicated above, in the illustrated embodiment, three three-phase multiposition disconnect switches 4 are disposed in the interior of housing 1, with each switch 4 including, per phase, a center of rotation contact 5 mounted on the feed-through 2, a movable contact 6 pivotably mounted on the contact 5 and constructed in the form of a simple pair of isolator blades, a switching rod 7 formed of insulating material and having one end pivotally connected to the contact 3, and a lever 8 having one end pivotally connected to the rod 7 and its other end mounted on a shaft 9 for rotation therewith. The three levers 8 of each three phase switch 4 are arranged one behind the other on the same shaft 9 so as to rotate together. Disposed in the path of movement of each moveable contact 6 is one contact 10 of the main bus bar 24, one contact 11 of the auxiliary bus bar 25 and one ground contact 12. As indicated above the spacing between bus bar contacts 10 and 11 is such that the contact 6 can bridge the space and simultaneously contact both contacts 10 and 11. Moreover, as shown in FIG. 2, as well as in FIGS. 3-7, the contacts 6, 10 and 11 form a slide or slip contact arrangement in that the contact 6 physically contacts and slides along each of the contacts 10 and 11.

All terminals of the three-phase switching system, or of a group of switches within the switching system, have a common, three-pole coupling switch 13, (only one pole of which is shown in FIG. 2) of known design. In the illustrated embodiment, the coupling switch 13 is shown as a vacuum switch including a vacuum switching chamber 14 disposed in a supporting structure 15 which is insulated from housing 1, a stationary contact 23, and a moveable contact 23A which can be mechanically actuated by means of a switching shaft 16, a lever 17, a switching rod 18 made of insulating material, a rocker 20 mounted at point 19, and a telescope-like drive plunger 22 provided with a tensioned contact compression spring 21. As shown, the stationary contact 23 is electrically connected with the main bus bar 24 and the moveable contact 23A is electrically connected with the auxiliary bus bar 25.

In each phase, one main bus bar 24 and one auxiliary bus bar 25 are fastened to insulating supporting elements 26 in such a manner that between the two bus bars, in the surrounding insulating medium or by other insulating measures, an insulation capability is assured which corresponds at least to the highest value of the switch voltage during a disconnect process. Each bus bar 24 and 25 is provided with a plurality of contacts 10 and 11 respectively, one for each multiposition disconnect switch 4, with the contacts 10 and 11 being each offset such that their lower end facing movable contact 6 is able to come into electrical sliding contact with the respective movable contact 6.

FIGS. 3 to 6 which will be described below, explain the sequence of a disconnect process for a switch 4 as shown in FIG. 2. The reverse sequence applies for a connect process.

FIGS. 3a and 3b show the switched-on position of the multiposition disconnect switch 4, with the current flowing through center of rotation contact 5, movable contact 6 and main bus bar contact 10 to main bus bar 24. Coupling switch 13 is in the closed position. However, no current flows through coupling switch 13 to the auxiliary bus bar 25. As can be clearly seen in FIG. 3b, the two blades of contact 6 slidingly engage both surfaces of contact 10.

For a disconnect, movable contact 6 moves in such a manner that it slidingly abuts on auxiliary bus bar contact 11 without relinquishing its connection with main bus bar contact 10. FIG. 4a shows the commutation position in which movable contact 6 bridges the two contacts 10 and 11. Since coupling switch 13 is still closed, further movement of movable contact 6 causes the switch of current flow from main bus bar 24 to auxiliary bus bar 25 to be made without interruption and without sparks. The current then flows from movable contact 6 through auxiliary bus bar contact 11, auxiliary bus bar 25 and coupling switch 13 to the main bus bar 24.

Figures 5A, 5B:
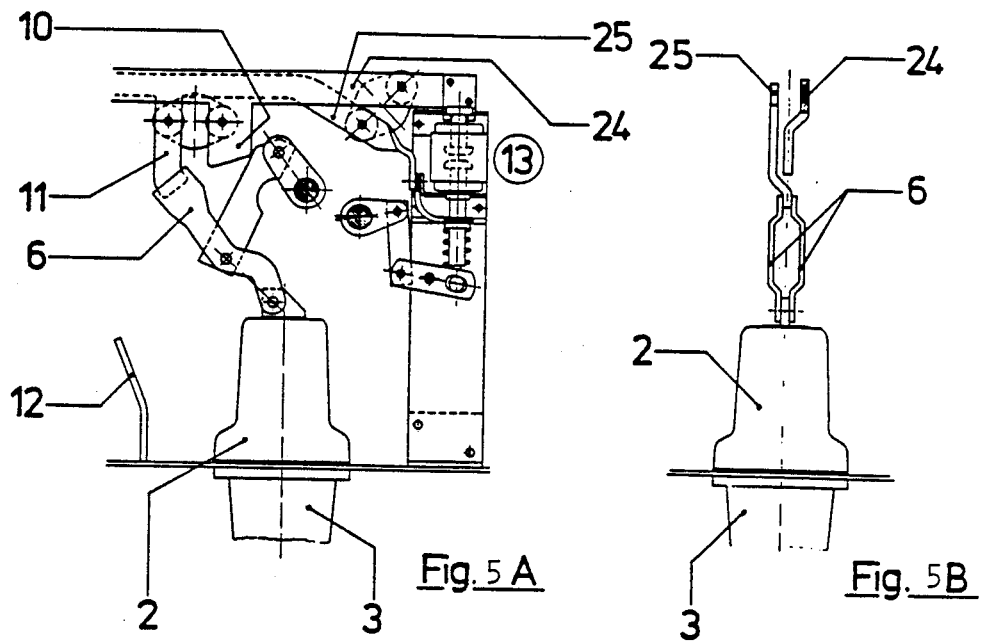
FIGS. 5a and 5b are views similar to FIGS. 3a and 3b, respectively, but with the disconnect switch in the position during opening of the coupling switch.

When the moveable contact 6 has moved so that it is in full contact with auxiliary bus bar contact 11 as shown in FIGS. 5a and 5b, the coupling switch 13 is opened to interrupt the flow of current between the bus bars 24 and 25 and thus through the contact 6. The distance between movable contact 6 and main bus bar contact 10 in this position is so large that compensating voltages, as they occur during all switching processes, cannot lead to sparkovers.

Figures 6A, 6B:
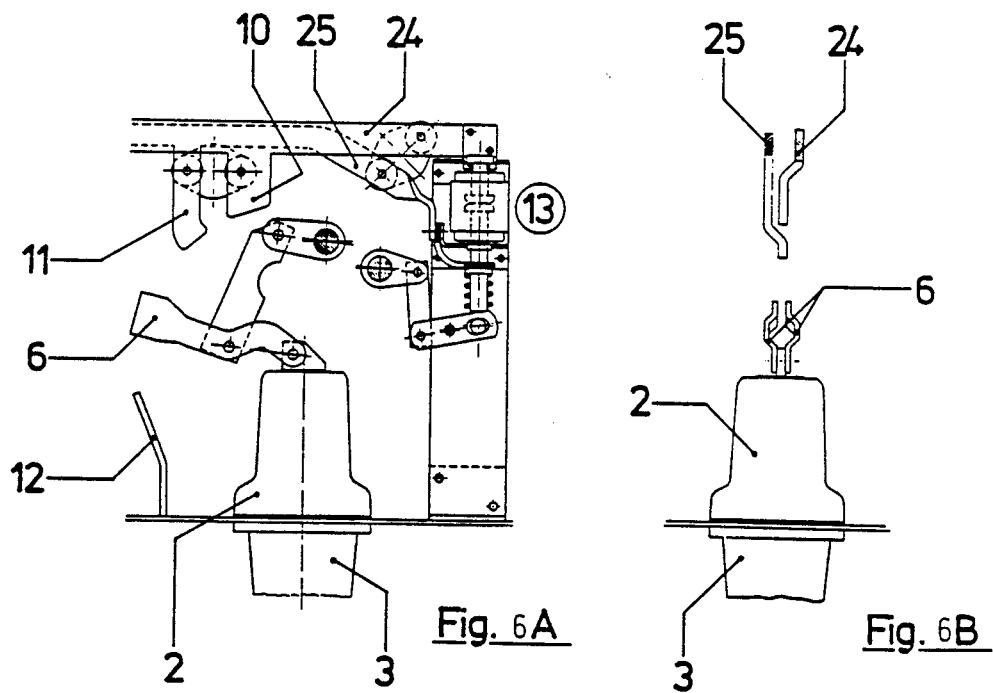
FIGS. 6a and 6b are views similar to FIGS. 3a and 3b, respectively, but with the disconnect switch in the OFF position.

During its further movement, movable contact 6 leaves auxiliary bus bar contact 11 with coupling switch 13 open. Shortly before movable contact 6 reaches the open position, i.e. position (d) of FIG. 1, but after galvanic separation from contact 11, coupling switch 13 is forced to close its contacts. The positions of the individual switching elements in the open position are shown in FIGS. 6a and 6b.

Figure 7A:
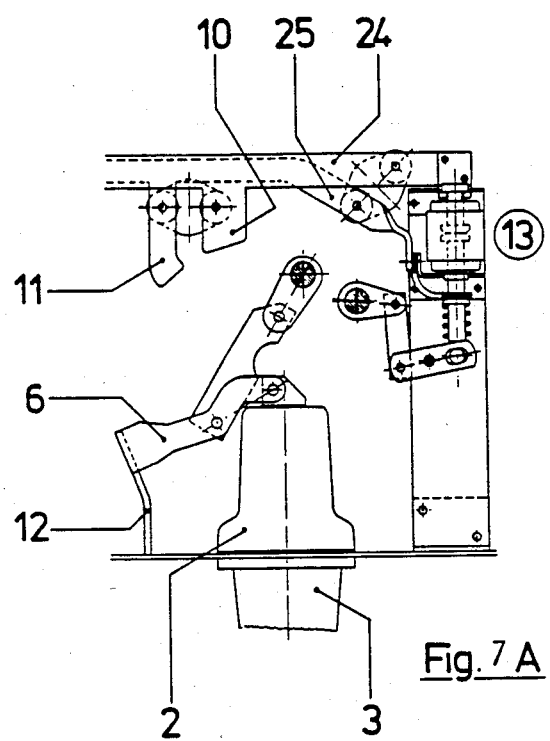
FIGS. 7a and 7b are views similar to FIGS. 3a and 3b, respectively, but with the disconnect switch in the grounded position.
Figure 7B:
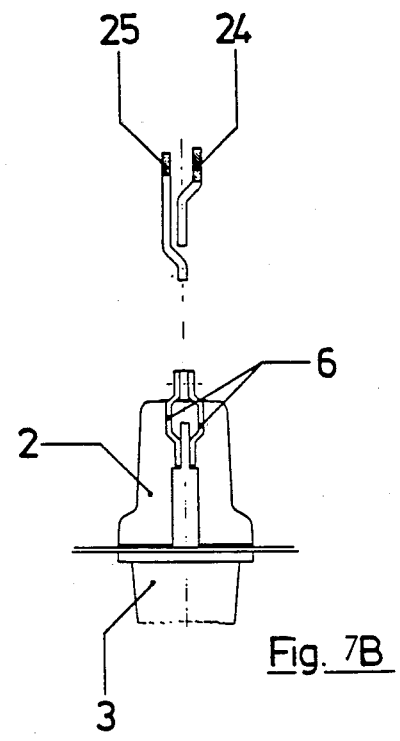

In a separate switching action, the disconnected terminal and its connected cable can also be additionally grounded. In this case, movable contact 6 is moved so that it comes into contact with ground contact 12 which is fastened at the housing 1, as shown in FIGS. 7a and 7b. Coupling switch 13 remains closed.

The energy store for coupling switch 13 and the details of the multiposition disconnect switches 4 are not part of the present invention. A drive device as disclosed in Federal Republic of Germany DE-OS No. 3,412,637 has been found satisfactory for the proposed electrical switching system. In it, the sole energy store is associated with the coupling switch which, for the performance of individual switching actions, can be selectively coupled with one multiposition disconnect switch at a time.

Figure 8A:
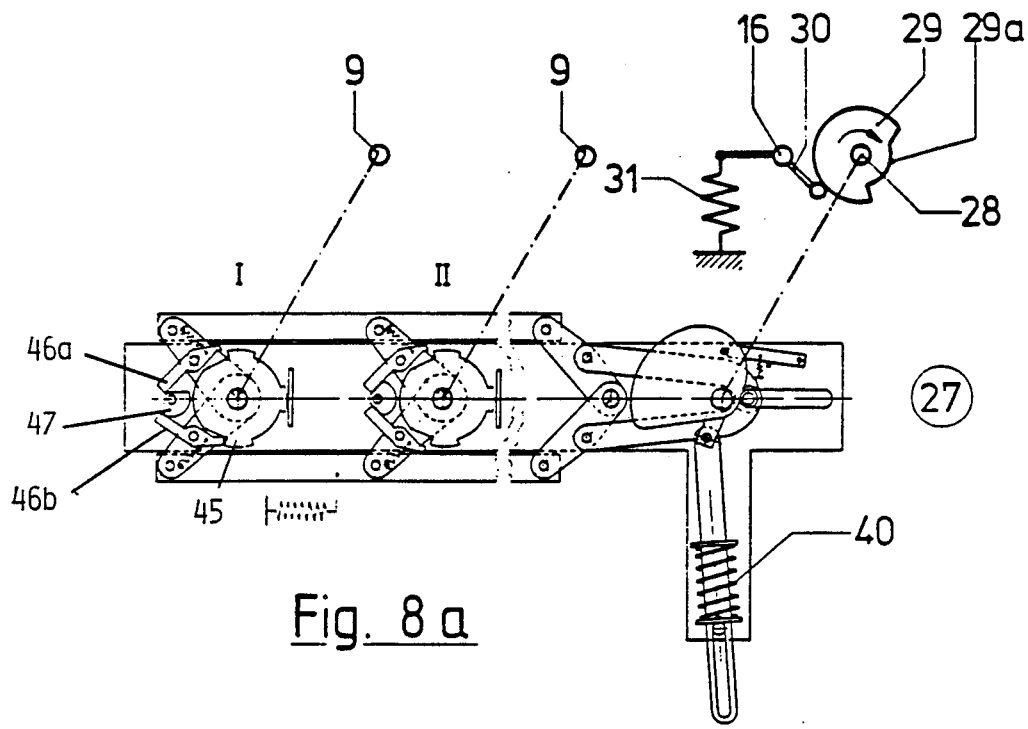
FIGS. 8a and 8b are partially schematic illustrations of an arrangement for the mechanical synchronization of a common drive for a plurality of multiposition disconnect switches with the drive for the coupling switch, with the left-hand multiposition disconnect switch I being shown in the ON and OFF position in the respective figures.
Figure 8B:
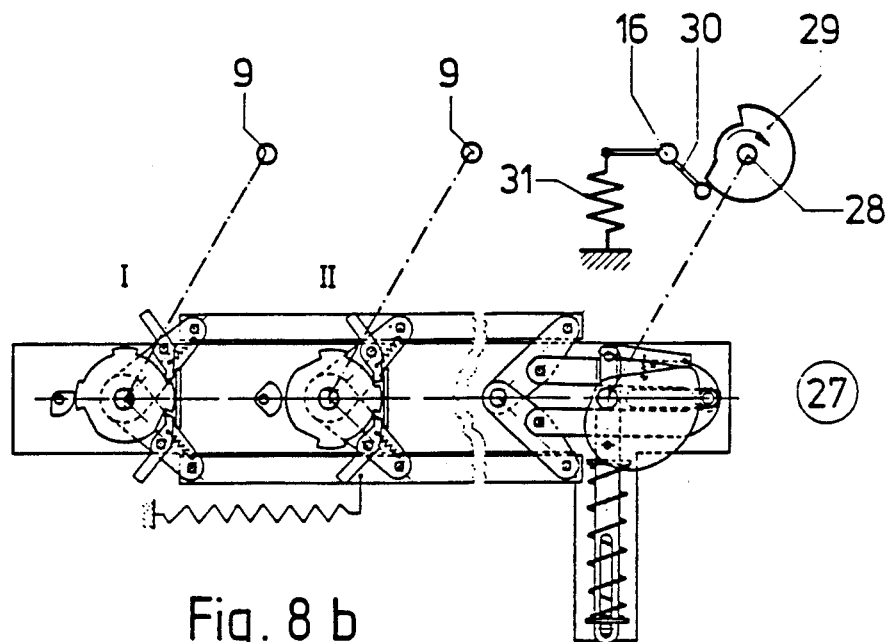

FIGS. 8a and 8b show the joint drive 27 disclosed in DE-OS No. 3,412,637 which has been modified to provide synchronization between the multiposition disconnect switches 4 and the coupling switch 13 of FIG. 2. As shown in FIGS. 8a and 8b, the rotatable shaft 28 of an energy store 40 is fastened to a cam disc 29 which cooperates with a guide or cam follower 30 connected to coupling switch shaft 16 (FIG. 2). A spring 31 is provided to ensure that guide 30 always presses against and rides on the outer outline of cam 29. Moreover, the shafts 9 (FIG. 2) of the multiposition disconnect switches 4 are shown as connected to respective discs 45 which can be selectively moved in the clockwise or counterclockwise directions by means of respective pivotally mounted pawls 46a, 46b whose positions are controlled by a pivotable cam 47 so that one or the other, or neither, of the pawls 46a, 46b will contact the disc 45 to rotate the shaft 9 when the drive 27 is energized.

In FIG. 8a, the energy store 40 is in its tensioned position and the two multiposition disconnect switches 4 (indicated as I and II in FIGS. 8a and 8b) are shown in the ON position. For turning off, for example, the left-hand multiposition disconnect switch I, the cam 47 is positioned as shown in FIG. 8a and the drive is energized so as to untension the energy store 40, causing the shaft 28 to rotate clockwise through approximately 180° and the drive arrangement 27 to take up the position shown in FIG. 8b. During this movement to the position of FIG. 8b, only the disc 45 of multiposition disconnect switch I was engaged and rotated by a pawl 46, i.e., the pawl 46b, causing the shaft 9 of switch I to have been simultaneously rotated counterclockwise about 90° and to have thus moved the movable contacts 6 (FIG. 2) from the ON position into the OFF position while passing through the positions shown in FIGS. 3a to 6a. In the intermediate position shown in FIG. 5a guide 30 passed through recess 29a in cam 29 and thus rotated shaft 16 and opened coupling switch 13. In FIG. 8b, wherein the energy store 40 is in the released position, rotation of shaft 28 about a further 180° will tension the energy store 40 again and return it to the position shown in FIG. 8a.

Figure 9:
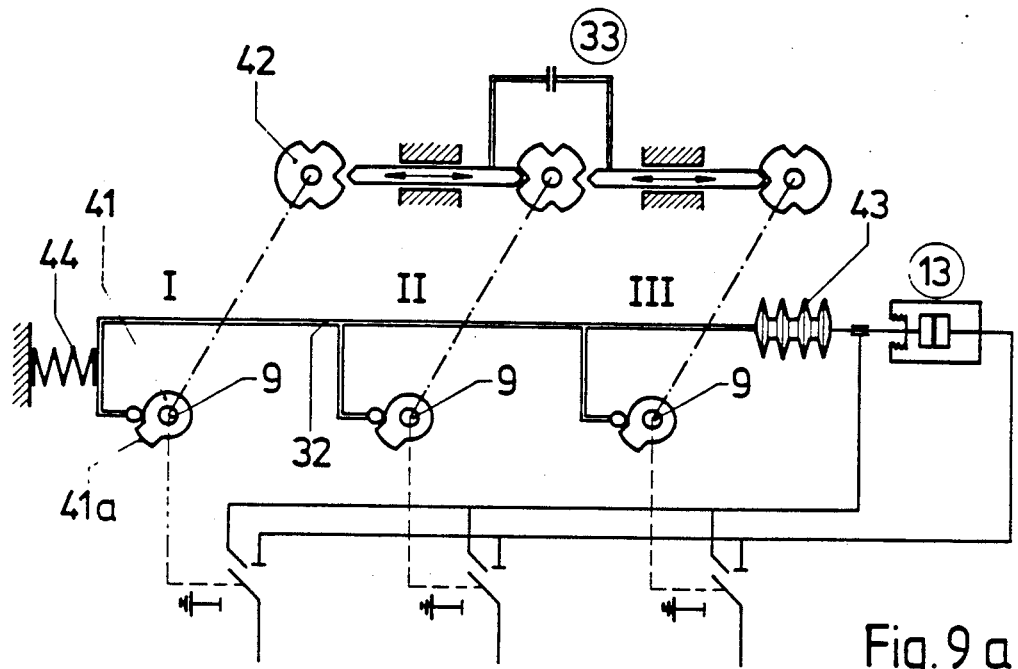
FIGS. 9a and 9b are schematic illustrations of an arrangement for the mechanical synchronization of the drives for a plurality of multiposition disconnect switches that are equipped with individual drives with the drives of the coupling switch, with the left-hand multiposition disconnect switch I being shown in the OFF and ON positions in the respective figures.
Figure 9:
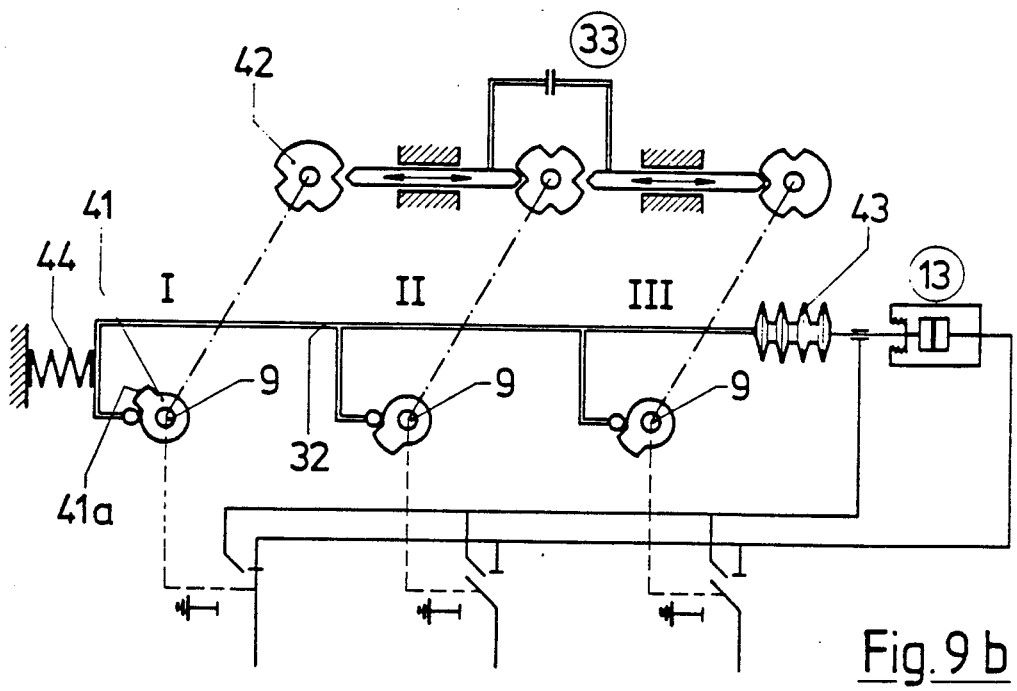

For the case that each multiposition disconnect switch 4 has its own, independent energy store or drive arrangement, FIGS. 9a and 9b provide a schematic illustration of another way of mechanically coupling the operation of the coupling switch 13 in synchronism with that of the respective multiposition disconnect switches 4 (indicated as I, II and III). In FIG. 9a, all three multiposition disconnect switches are shown in the disconnect position. Switch shafts 9 are each equipped with respective cam discs 41, which cooperate with a connecting rod assembly 32, as well as with a respective blocking disc 42 which cooperates with locking rod assembly 33. Connecting rod assembly 32 acts, via an isolator 43, on the movable contact of coupling switch 13. When the left-hand multiposition disconnect switch I is switched from the disconnect position of FIG. 9a into the ON position of FIG. 9b, its shaft 9 is rotated clockwise about 90° by the energy store or drive (not shown) of this switch, thus moving movable contacts 6 (FIG. 2) from the position shown in FIG. 6a to the position shown in FIG. 3a. This causes cam 41a disposed on cam disc 41 to open coupling switch 13, against the force of retention spring 44 and via rod assembly 32, shortly before movable contact 6 contacts the fixed contact 11, while in the position shown in FIG. 5a, the coupling switch closes again and thus switches on the current in the branch controlled by switch I.

The locking rod assembly 33, in cooperation with the blocking discs 42, prevents simultaneous actuation of two or more multiposition disconnect switches I, II and III.

When one multiposition disconnect switch I, II or III is opened, the above-described steps occur in the reverse direction, i.e. the coupling switch 13 is opened by means of the described mechanism in the position shown in FIG. 5a, and is closed between the positions shown in FIGS. 5a and 6a.

Figure 10:
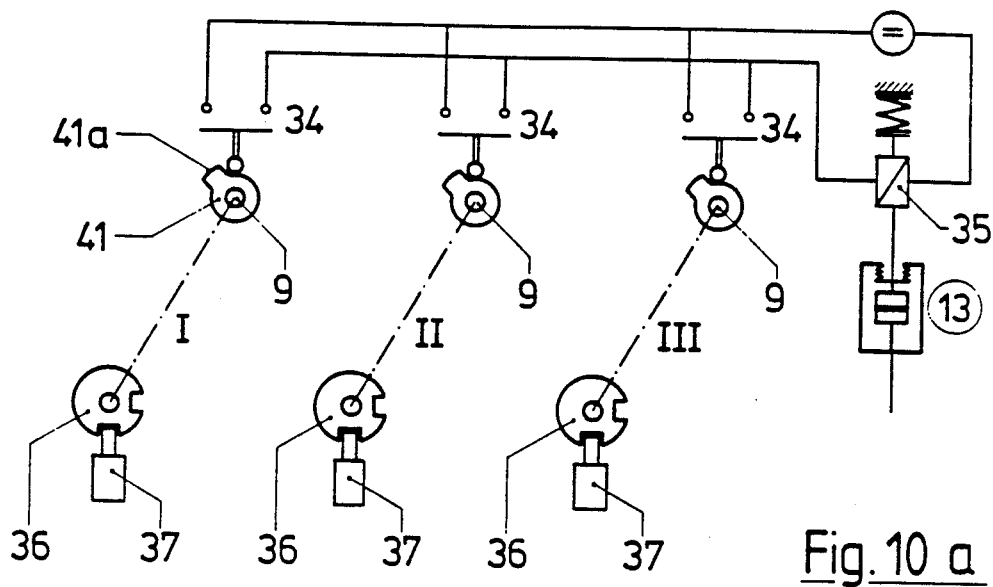
FIGS. 10a and 10b are schematic illustrations of an arrangement for the electrical synchronization of the drives for a plurality of individually driven multiposition disconnect switches with the drive of the coupling switch, with the left-hand multiposition disconnect switch I being shown in the OFF and On positions in the respective figures.
Figure 10:
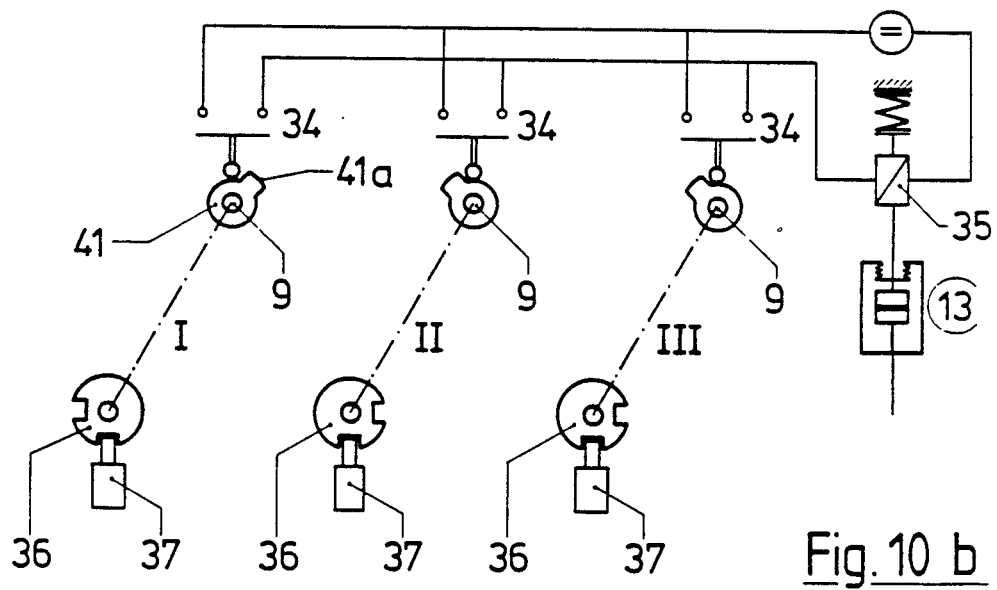

For multiposition disconnect switches 4 each having their own energy store or drive, it is also possible, according to FIGS. 10 and 10b, to electrically synchronize them with the coupling switch 13. For this purpose, a magnetic drive 35 is provided to move the contacts of coupling switch 13, with one control contact 34 being connected in the input line of the magnet drive 35 for each multiposition disconnect switch I, II and III. In principle, the ON and OFF switching again occurs as described above, with the difference that here cam disc 41, by actuating control contact 34 via cam 41a, closes the circuit of magnetic drive 35 and shortly thereafter open it again, which causes the coupling switch 13 to be switched off and on as intended. For multiposition disconnect switch I, FIG. 10a, shows the respective shaft 9 in the disconnect or OFF position and FIG. 10b shows the shaft 9 in the ON position. In order to prevent two or more switches from being actuated simultaneously, either a mechanical lock as shown in FIGS. 9a and 9b or an electrical lock as shown in FIGS. 10a and 10b is provided. The electrical lock of FIGS. 10 and 10b operates with the aid of blocking magnets 37 which cooperate with suitably designed blocking discs 36 mounted on the respective shafts 9.

It will be understood that the above description of the present invention is susceptible to various modifications, changes and adaptations, and the same are intended to be comprehended within the meaning and range of equivalents of the appended claims.

What is claimed is:

1. In an electrical switching system, particularly a medium voltage switching system, for a plurality of input and output terminals, including a main bus bar, an auxiliary bus bar, a coupling switch means, electrically connected between said bus bars, for performing the connections of loads and power, for said plurality of input and output terminals, and disconnect switch means for selectively connecting each of said terminals with said bus bars; the improvement wherein: said disconnect switch means includes a respective single multiposition disconnect switch connected to each of said terminals for selectively connecting same to said bus bars, with each sid multiposition disconnect switch having a normal ON-position wherein it forms a direct electrical connection between the respective associated one of said terminals and only said main bus bar, a further ON position wherein it forms a direct electrical connection between the respective associated one of said terminals and said auxiliary bus bar, and means for effecting, during switching, the transition of current from said main bus bar to said auxiliary bus bar without interruption of the current; and the respective said terminals are in direct electrical connection with only said main bus bar via the respective said multiposition disconnect switches during normal operation and are connected with said auxiliary bus bar only during respective connect and disconnect processes.

2. An electrical switching system as defined in claim 1 wherein said means for effecting includes a slip contact arrangement for each said multiposition-disconnect switch.

3. An electrical switching system as defined in claim 2 wherein said slip contact arrangement of each said multiposition disconnect switch includes: a moveable slip contact connected to the respective associated one of said terminals, a first stationary slip contact connected to said main bus bar, and a second stationary slip contact connected to said auxiliary bus bar said first and second stationary slip contacts being spaced and disposed in the path of movement of said moveable slip contact, and said moveable slip contact having a length sufficient to bridge the space between said stationary slip contacts and simultaneously contact both said first and second stationary slip contacts.

4. An electrical switching system as defined in claim 1 further comprising means, during a connect or disconnect process for a respective one of said terminals, for causing the associated one of said disconnect switches to remain in its said further ON position, and thus connect the associated said terminal to said auxiliary bus bar until said coupling switch means connected between said main bus bar, and said auxiliary bus bar has performed the connection or disconnection for the respective said terminal which is now connected electrically in series therewith.

5. An electrical switching system as defined in claim 1 wherein each said multiposition switch connects its associated one of terminals said to only said auxiliary bus bar when in said further ON position; wherein each of said multiposition disconnect switches is of the same basic configuration; and wherein each of said multiposition disconnect switches has at least the following additional positions: another ON-position which is intermediate said normal ON-position and said further ON-position and in which the associated respective one of terminals said is connected with both said main and said auxiliary bus bars; and an Off-position wherein the associated respective one of said terminals is disconnected from both said main and said auxiliary bus bars.

6. An electrical switching system as defined in claim 5 wherein at least some of said multiposition disconnect switches have a further position in which the associated respective one of said terminals is connected with a ground contact.

7. An electrical switching system as defined in claim 1 wherein said coupling switch means is a normally closed switch.

8. An electrical switching system as defined in claim 5, further comprising: means for connecting the drives of said coupling switch means to the drives of said multiposition disconnect switches to cause the connection and disconnection of a terminal to be effected by only one switching instruction which acts on both said coupling switch means and the particular one of said multiposition disconnect switches being actuated.

9. A method of operating an electrical switching system, particularly a medium voltage switching system, for a plurality of input and output terminals, of the type including a main bus bar, an auxiliary bus bar, a coupling switch means, electrically connected between said bus bars, for performing the connections of loads and power for said plurality of input and output terminals, and disconnect switch means for selectively connecting each of said terminals with said bus bars, and wherein said disconnect switch means includes a respective single multiposition disconnect switch connected to each of said terminals for selectively connecting same to said bus bars, with each of said multiposition disconnect switches being of the same basic configuration and having a normal ON-position wherein it forms a direct electrical connection between the respective associated one of the said terminals and only said main bus bar, a further ON position wherein it forms a direct electrical connection between the respective associated one of said terminals and only said auxiliary bus bar, an intermediate ON-position which is intermediate said normal ON-position and said further ON-position and in which the associated respective one of said terminals is connected with both said main and said auxiliary bus bars, an OFF-position wherein the associated respective one of said terminals is disconnected from both said main and said auxiliary bus bars, and means for effecting, during switching the transition of current from said main bus bar to said auxiliary bus bar without interruption of the current, and wherein the respective said terminals are in direct electrical connection with only said main bus bar via the respective said multiposition disconnect switches during normal operation and are connected with said auxiliary bus bar only during respective connect and disconnect processes; said method comprising: before and after a switching process to connect or disconnect a respective one of said terminals, causing all of said multiposition disconnect switches associated with a current flowing through a respective said terminal to be in their correspnding said normal ON-position so that all currents flowing in said plurality of terminals flow through said main bus bar, and said auxiliary bus bar is without current: and synchronizing the actuation of said coupling switch means and of said multiposition disconnect switch to assure the proper time sequence of the switching actions.

10. A method as defined in claim 9, further comprising causing said coupling switch means disposed between said main bus bar and said auxiliary bus bar to be in the closed state before and after each switching action.

11. A method as defined in claim 10 further comprising disconnecting one of said terminals by from said main bus bar by: actuating the corresponding said multiposition disconnect switch to move same from said normal ON position to said intermediate ON-position and then to said further ON position to commutate, without interruption and without sparks, the current of said one of said terminals to said auxiliary bus bar; opening said coupling switch means to interrupt the said current; thereafter moving said corresponding multiposition disconnect switch into said disconnect position; and then closing said coupling switch means.

12. A method according to claim 11 further comprising connecting a disconnected terminal to cause a current to flow by: initially opening said coupling switch means and actuating the corresponding said multiposition disconnect switch to move same from said OFF-position to said further ON-position; closing said couplings switch means when said corresponding multiposition disconnect switch is in said further ON-position to turn on the current, and thereafter further moving said corresponding multiposition disconnect switch to said normal ON-position to commutate the current flow without interruption and without sparks from said auxiliary bus bar to said main bus bar.

13. A method of operating an electrical switching system, particularly a medium voltage switching system, for a plurality of input and output terminals including a main bus bar, an auxiliary bus bar, a normally closed coupling switch electrically connected between said bus bars for performing the connections of loads and power for said plurality of terminals, and a single respective multiposition disconnect switch for each said terminal and having a moveable contact connected to the respective said terminal; and wherein during normal operation said terminals are all interconnected via direct connections between their respective said multiposition disconnect switches and said main bus bar to cause current flow; said method of comprising the step of disconnecting one of said terminals from said main bus bar to interrupt the current flowing through said one terminal by: moving said moveable contact of the corresponding one of said multiposition disconnect switches so as to cause same to simultaneously contact both said main bus bar and said auxiliary bus bar and subsequently to contact only said auxiliary bus bar whereby the current flowing through said one terminal commutates without interruption, to said auxiliary bus bar via said closed coupling switch; while said moveable contact is contacting only said auxiliary bus bar, opening said coupling switch to interrupt the current flowing through said one terminal; and thereafter moving said moveable contact to an open position wherein it is disconnected from both of said bus bars and then closing said coupling switch.

14. A method as defined in claim 13 further comprising the step of connecting a terminal, whose associated moveable contact is in said open position, to said main bus bar to cause a current to flow through this terminal by: opening said coupling switch; moving the associated said moveable contact to connect same to said auxiliary bus bar; closing said coupling switch to cause a current to flow through said associated said moveable contact via coupling switch and said auxiliary bus bar; thereafter moving said associated moveable contact to cause same to simultaneously contact both said bus bars and then to contact only said main bus bar, whereby the current flowing through said associated said moveable contact is commutated to said main bus bar without interruption and said auxiliary bus bar is without current.

15. The method of claim 14 wherein said moveable contact forms a slip contact arrangement with the contacts provided for said main and said auxiliary bus bars.

16. An electrical switching system, particularly a medium voltage switching system, for selectively connecting and disconnecting a plurality of power input and output load terminals to and from each other via a bus bar, said system comprising in combination: a main bus bar; an auxiliary bus bar; a single normally closed coupling switch means, electrically connected between said bus bars, for selectively permitting and interrupting a flow of current between said bus bars; a respective multiposition switch connected to each of said terminals with each said multiposition switch having a first ON-position wherein it directly connects a respective one of said terminals with only said main bus bar, a second ON-position wherein it directly connects said one terminal with both of said bus bars, a third ON position wherein it directly connects said one of said terminals with only said auxiliary bus bar, and a fourth OFF position wherein said one of said terminals is disconnected from both of said bus bars; drive means for sequentially moving a respective one of said switches from said fourth to said first position and vice versa to respectively connect or disconnect a respective one of said terminals to said main bus bar and thus to another of said terminals connected to said main bus bar; and means for selectively opening and closing said coupling switch means in synchronism with said drive means to open said coupling switch means only when one of said switches is in said third position during a disconnect sequence, and to open said coupling switch means when a respective switch is in said fourth position and to close said coupling switch means in said third position during a connect sequence.

17. An electrical switching system as defined in claim 16 wherein each of said multiposition switches includes: a moveable slip contact connected to the respective one of said terminals; first and second stationary slip contacts connected respectively to only said main bus bar and to only said auxiliary bus bar, said first and second stationary slip contacts being spaced and disposed in the path of movement of said moveable contact so that said moveable contact directly contacts said first and said contacts at said first and third positions respectively of said switch; and said movable slip contact has a length sufficient to bridge the space between said first and second stationary slip contacts, and simultaneously directly contact said first and second stationary slip contacts at said second position of said switch.

* * * * *